(12) United States Patent
Shin

(10) Patent No.: US 12,671,866 B2
(45) Date of Patent: Jun. 30, 2026

(54) DETERMINING A TIME POINT TO SKIP TO WITHIN A MEDIA ITEM USING USER INTERACTION EVENTS

(71) Applicant: Google LLC, Mountain View, CA (US)

(72) Inventor: Dongeek Shin, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/137,813

(22) Filed: Apr. 21, 2023

(65) Prior Publication Data

US 2024/0357202 A1     Oct. 24, 2024

(51) Int. Cl.
H04N 21/442 (2011.01)
H04N 21/466 (2011.01)
H04N 21/472 (2011.01)

(52) U.S. Cl.
CPC ... H04N 21/44222 (2013.01); H04N 21/4667 (2013.01); H04N 21/47217 (2013.01)

(58) Field of Classification Search
CPC ......... H04N 21/44222; H04N 21/4667; H04N 21/47217; H04N 21/2387; H04N 21/6587

USPC ......................................................... 386/343
See application file for complete search history.

(56) References Cited

U.S. PATENT DOCUMENTS

| | | | |
|---|---|---|---|
| 2017/0085854 A1* | 3/2017 | Furesjö | H04N 9/8715 |
| 2019/0200051 A1* | 6/2019 | Paul | H04N 21/4788 |
| 2021/0037287 A1* | 2/2021 | Ha | G02B 27/017 |
| 2023/0075650 A1* | 3/2023 | Eromaki | H04N 21/816 |

* cited by examiner

*Primary Examiner* — Thai Q Tran
*Assistant Examiner* — Nienru Yang
(74) *Attorney, Agent, or Firm* — Lowenstein Sandler LLP

(57) ABSTRACT

A method for determining a time point to skip to within a media item using user interaction events includes providing a media item to a user identifying one or more user interaction events each associated with the user skipping to a particular time point during current playback of the media item, determining a next time point intended by the user to skip to during the current playback of the media item, and causing playback of the media item to be skipped to the determined next time point.

17 Claims, 7 Drawing Sheets

400

305

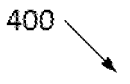

400

Provide a media item to a user of a platform 410

Identify one or more user interaction events each associated with a user skipping to a particular time point during current playback of the media item 420

Determine a next time point intended by the user to skip to during the current playback of the media item 430

Determine a plurality of viewing data for the media item based on the one or more user interaction events during current playback of the media item and user interaction events during prior playbacks of the media item 440

Identify, based on the determined plurality of viewing data, the next time point intended by the user to skip to during the current playback of the media item 450

Cause the playback of the media item to skip to the determined next time point 460

FIG. 4

DETERMINING A TIME POINT TO SKIP TO WITHIN A MEDIA ITEM USING USER INTERACTION EVENTS

TECHNICAL FIELD

Aspects and implementations of the present disclosure relate to determining a time point to skip to within a media item using user interaction events.

BACKGROUND

A platform (e.g., a content platform) can transmit (e.g., stream) media items to client devices connected to the platform via a network. A media item can include a video item and/or an audio item, in some instances. Users can consume the transmitted media items via a user interface (UI) provided by the platform. In some instances, the user may wish to skip to a particular time point during current playback of the transmitted media item instead of consuming the entire transmitted media item from the start. The user may interact with a scroll bar on the UI to scroll to the particular time point to which they wish to skip.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

An aspect of the disclosure provides a computer-implemented method that includes providing a media item to a user of a platform. The method further includes identifying one or more user interaction events each associated with the user skipping to a particular time point during current playback of the media item. The method further includes determining a next time point intended by the user to skip to during the current playback of the media item. To determine the next time point, the method further includes determining a plurality of viewing data for the media item based on the one or more user interaction events during the current playback of the media item and user interaction events during prior playbacks of the media item. The method further includes identifying, based on the determined plurality of viewing data, the next time point intended by the user to skip to during the current playback of the media item. The method further includes causing playback of the media item to skip to the determined next time point.

In some implementations, the one or more user interaction events include one or more interaction events with one or more user interface (UI) elements pertaining to presentation of the media item, where the media item is being presented on a UI of a client device associated with the user. In some implementations, the one or more UI elements include a scroll bar and a cursor. In some implementations to identify the one or more user interaction events, the method further includes identifying a change in a position of the cursor relative to the scroll bar from a first position to a second position, where the second position corresponds to the particular time point within the media item.

In some implementations, to determine the plurality of viewing data for the media item, the method further includes identifying a first representation of a first subset of the plurality of viewing data for the media item, the first subset including previous views of a plurality of users associated with the media item. The method further includes identifying a second representation of a second subset of the plurality of viewing data for the media item, the second subset including previous views of the media item by the user. The method further includes identifying a third representation of a third subset of the plurality of viewing data for the media item, the third subset being based on the one or more user interaction events and including one or more trajectory values of the cursor at one or more time points during current playback of the media item, wherein the one or more trajectory values of the cursor comprises a trajectory value that is based on the change in the position of the cursor from the first position to the second position. In some implementations, the method further includes identifying a fourth representation of a fourth subset of the plurality of viewing data for the media item, the fourth subset includes previous views of the media item by users connected to the user, wherein the users connected to the user comprises social connections of the user and/or contacts of the user. In some implementations, each representation comprises a histogram, where each subset of the plurality of viewing data is aggregated and normalized in a vector format.

In some implementations, to determine the next time point, the method further includes providing the plurality of viewing data for the media item as input to a machine learning model, where the machine learning model is trained to predict the next time point intended by the user to skip to during the current playback of the media item. The method further includes obtaining an output of the machine learning model, where the obtained output indicates the next time point to skip to during the current playback of the media item. In some implementations, the machine learning model is a one-dimensional (1D) multi-headed convolutional neural network with one or more fully connected layers.

In some implementations, identifying the next time point intended by the user to skip to is performed at a client device of the user.

An aspect of the disclosure provides a system including a memory device and a processing device communicatively coupled to the memory device. The processing device performs operations including providing a media item to a user of a platform. The operations further include identifying one or more user interaction events each associated with the user skipping to a particular time point during current playback of the media item. The operations further include determining a next time point intended by the user to skip to during the current playback of the media item. To determine the next time point, the operations further include determining a plurality of viewing data for the media item based on the one or more user interaction events during the current playback of the media item and user interaction events during prior playbacks of the media item. The operations further include identifying, based on the determined plurality of viewing data, the next time point intended by the user to skip to during the current playback of the media item. The operations further include causing playback of the media item to skip to the determined next time point.

In some implementations, the one or more user interaction events includes one or more interaction events with one or more user interface (UI) elements pertaining to presentation of the media item, where the media item is being presented on a UI of a client device associated with the user. In some implementations, the one or more UI elements includes a scroll bar and a cursor. In some implementations to identify the one or more user interaction events, the operations further include identifying a change in a position of the cursor relative to the scroll bar from a first position to a second position, where the second position corresponds to the particular time point within the media item.

In some implementations, to determine the plurality of viewing data for the media item, the operations further include identifying a first representation of a first subset of the plurality of viewing data for the media item, the first subset including previous views of a plurality of users associated with the media item. The operations further include identifying a second representation of a second subset of the plurality of viewing data for the media item, the second subset including previous views of the media item by the user. The operations further include identifying a third representation of a third subset of the plurality of viewing data for the media item, the third subset being based on the one or more user interaction events and including one or more trajectory values of the cursor at one or more time points during current playback of the media item, wherein the one or more trajectory values of the cursor comprises a trajectory value that is based on the change in the position of the cursor from the first position to the second position. In some implementations, the operations further include identifying a fourth representation of a fourth subset of the plurality of viewing data for the media item, the fourth subset includes previous views of the media item by users connected to the user, wherein the users connected to the user comprises social connections of the user and/or contacts of the user. In some implementations, each representation comprises a histogram, where each subset of the plurality of viewing data is aggregated and normalized in a vector format.

In some implementations, to determine the next time point, the operations further include providing the plurality of viewing data for the media item as input to a machine learning model, where the machine learning model is trained to predict the next time point intended by the user to skip to during the current playback of the media item. The operations further include obtaining an output of the machine learning model, where the obtained output indicates the next time point to skip to during the current playback of the media item. In some implementations, the machine learning model is a one-dimensional (1D) multi-headed convolutional neural network with one or more fully connected layers.

In some implementations, to cause playback of the media item to skip to the determined next time point, the operations further include storing the next time point in local memory of a client device of the user, where the local memory is accessible to a client application hosted by the client device to provide the current playback of the media item.

An aspect of the disclosure provides a computer program including instructions that, when the program is executed by a processing device, cause the processing device to perform operations including providing a media item to a user of a platform. The operations further include identifying one or more user interaction events each associated with the user skipping to a particular time point during current playback of the media item. The operations further include determining a next time point intended by the user to skip to during the current playback of the media item. To determine the next time point, the operations further include determining a plurality of viewing data for the media item based on the one or more user interaction events during the current playback of the media item and user interaction events during prior playbacks of the media item. The operations further include identifying, based on the determined plurality of viewing data, the next time point intended by the user to skip to during the current playback of the media item. The operations further include causing playback of the media item to skip to the determined next time point.

In some implementations, the one or more user interaction events includes one or more interaction events with one or more user interface (UI) elements pertaining to presentation of the media item, where the media item is being presented on a UI of a client device associated with the user. In some implementations, the one or more UI elements includes a scroll bar and a cursor. In some implementations to identify the one or more user interaction events, the operations further include identifying a change in a position of the cursor relative to the scroll bar from a first position to a second position, where the second position corresponds to the particular time point within the media item.

In some implementations, to determine the plurality of viewing data for the media item, the operations further include identifying a first representation of a first subset of the plurality of viewing data for the media item, the first subset including previous views of a plurality of users associated with the media item. The operations further include identifying a second representation of a second subset of the plurality of viewing data for the media item, the second subset including previous views of the media item by the user. The operations further include identifying a third representation of a third subset of the plurality of viewing data for the media item, the third subset being based on the one or more user interaction events and including one or more trajectory values of the cursor at one or more time points during current playback of the media item, wherein the one or more trajectory values of the cursor comprises a trajectory value that is based on the change in the position of the cursor from the first position to the second position. In some implementations, the operations further include identifying a fourth representation of a fourth subset of the plurality of viewing data for the media item, the fourth subset includes previous views of the media item by users connected to the user, wherein the users connected to the user comprises social connections of the user and/or contacts of the user. In some implementations, each representation comprises a histogram, where each subset of the plurality of viewing data is aggregated and normalized in a vector format.

In some implementations, to determine the next time point, the operations further include providing the plurality of viewing data for the media item as input to a machine learning model, where the machine learning model is trained to predict the next time point intended by the user to skip to during the current playback of the media item. The operations further include obtaining an output of the machine learning model, where the obtained output indicates the next time point to skip to during the current playback of the media item. In some implementations, the machine learning model is a one-dimensional (1D) multi-headed convolutional neural network with one or more fully connected layers.

In some implementations, to cause playback of the media item to skip to the determined next time point, the operations further include storing the next time point in local memory of a client device of the user, where the local memory is accessible to a client application hosted by the client device to provide the current playback of the media item.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 4 depicts a flow diagram of an example method for determining a time point to skip to within a media item using user interaction events, in accordance with implementations of the present disclosure.

DETAILED DESCRIPTION

Figure 1:
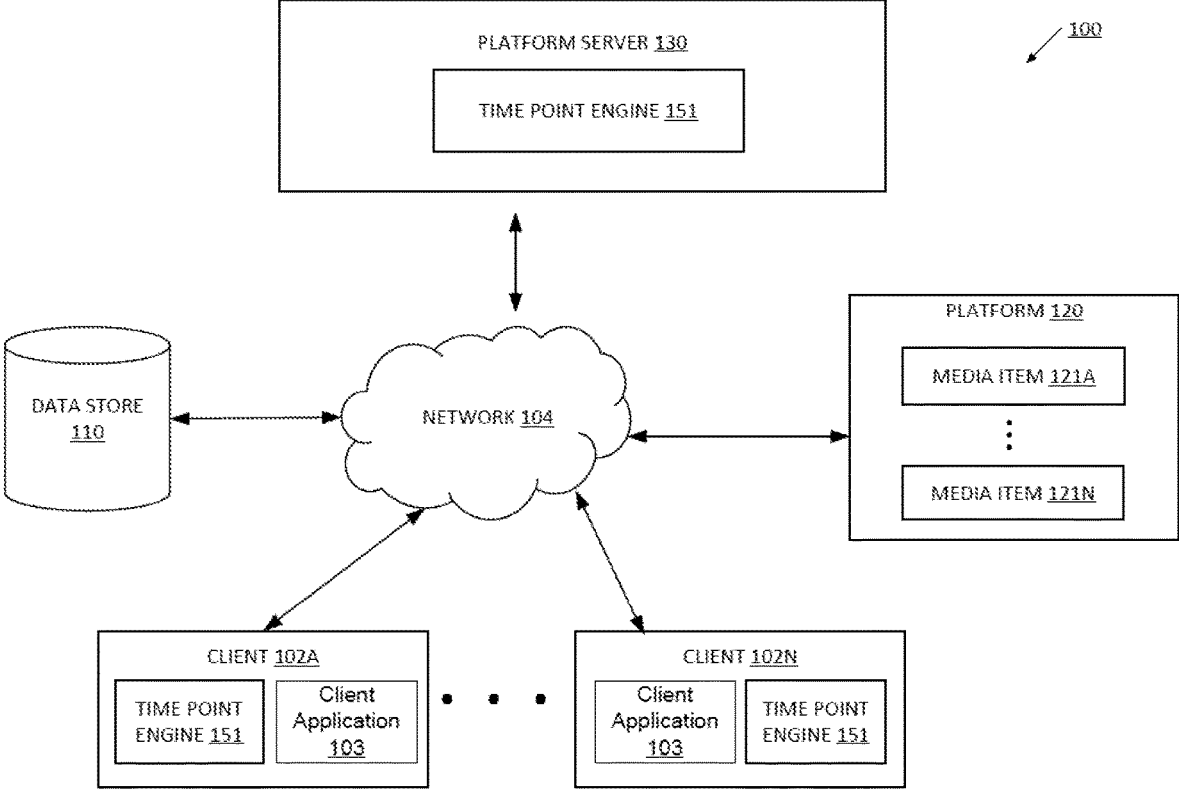
FIG. 1 illustrates an example system architecture, in accordance with implementations of the present disclosure.

Aspects of the present disclosure relate to determining a time point to skip to within a media item using user interaction events. A platform (e.g., a content platform, etc.) can enable a user to access a media item (e.g., a video item, an audio item, etc.) provided by another user of the platform. For example, a first user of a content platform can provide (e.g., upload) a media item to a content platform via a graphical user interface (GUI) provided by the content platform to a client device associated with the first user. A second user of the content platform can access the media item provided by the first user via a content platform GUI at a client device associated with the second user.

In some instances, when a user accesses the media item, the user may wish to skip to a time point while consuming the media item (e.g., while watching a video item). For example, the user may wish to skip to a time point that they want to revisit and/or fast-forward to. However, the user may not know the time point at which they want to skip to within the media item. Typically, the user can interact with a scroll bar (e.g., time bar) on the GUI to scroll to the time point within the media item to which they wish to skip. The scroll bar can include different portions that each represent a different time point within the media item. For example, the user can scroll through the scroll bar using a cursor and select (e.g., click on) a portion of the scroll bar representing the time point that they wish to skip to. In another example, the user can scroll through the scroll bar using a touch screen interface of the GUI (e.g., on the user's mobile device) and select (e.g., click on using their finger(s), a stylus, etc.) the portion of the scroll bar representing the time point that they wish to skip to. Typically, the platform can skip playback of the media item to the time point that the user selects. The user can thus consume the media item (e.g., watch the video item) at the selected time point, rather than consuming the entire media item from the start (e.g., an initial time point and/or initial video frame of the video item). However, interacting with the scroll bar may not be accurate in selecting a time point that the user intended to skip to, particularly when the user is consuming the media item at a client device with a smaller screen size (e.g., a mobile device). For example, when clicking on a portion of the scroll bar using a cursor, the cursor-to-scroll bar ratio can be large. Thus, the user may not be able to click on the portion of the scroll bar that represents the precise time point that the user intended to skip to. Instead, the user may click on a portion of the scroll bar that represents a time point that is, for example, plus or minus a few seconds away from the time point that the user intended to skip to. In another example, when clicking on a portion of the scroll bar using a touch screen interface (e.g., the user using their finger to click on the portion of the scroll bar on the user's mobile device), the finger touch-to-scroll bar ratio can be large. Thus, the user may be unable to pinpoint the portion of the scroll bar that represents the precise time point that the user intended to skip to. Instead, the user may click on a portion of the scroll bar that represents a time point that is, for example, plus or minus a few seconds away from the time point that the user intended to skip to. This can result in needless use of computing resources consumed by playback of a media item portion that the user is not interested in viewing.

Aspects of the present disclosure address the above and other deficiencies by providing techniques for determining a time point to skip to within a media item using user interaction events. A media item creator can provide a media item to a platform for access by one or more users of the platform. The media item can correspond to a video item, an audio item, a collection of images (e.g., a slide presentation), etc. One or more user interaction events associated with the media item can be identified at one or more time points within the media item. For example, the user interaction events can include one or more interaction events with one or more user interface (UI) elements that pertain to the presentation of the media item to the user, such as a user click operation or a user scrolling operation in relation to the UI elements, which may include, for example, a scroll bar (e.g., a time bar), a representation of a cursor, etc. Identifying the user interaction events can include identifying a change in the position of the cursor relative to the scroll bar from one position to another position, such as to select a particular time point within the media item to skip to during current playback of the media item. A next time point that the user intended to skip to during the current playback of the media item can be determined. In some implementations, determining the next time point can include determining a set of viewing data for the media item based on the identified user interaction events during the current playback of the media item and one or more user interaction events during prior playbacks of the media item. For example, the user interaction events during prior playbacks of the media item can include previous views of the media item by a set of users, previous views of the media item by the user (e.g., the user currently consuming the media item), previous views of the media item by one or more users connected to the user, such as social connections of the user and/or contacts of the user, etc. Particular representations of individual sets of viewing data can be created. For example, the user interaction events during the current playback of the media item can be represented in vector format in a first histogram, as described in more details herein. The previous views of the media item by the set of users can be represented in vector format in a second histogram, as described in more details herein. The previous views of the media item by the user can be represented in vector format in a third histogram, as described in more details herein. In some implementations, the representations of the portions of the viewing data for the media item (e.g., each of the histograms) are provided as input to a machine learning model that is trained to predict the next time point intended by the user to skip to during current playback of the media item. As such, an output of the machine learning model can indicate the next time point to skip to and may, for example, reflect a "correction" from an inaccurate user interaction event (e.g., touch-and-scroll event) to a more refined user intent-driven time point based on prior history discussed above. Thus, in response to the user request to skip to a particular time point during current playback of the media item, the time point that the user intended to skip to can be determined, and playback of the media item can be skipped to the determined time point.

Aspects of the present disclosure provide technical advantages over previous solutions. Aspects of the present disclosure can improve the experience of a user using a platform application to consume a media item by more accurately determining a time point within the media item to which a user intended to skip, particularly when consuming the media item on devices with smaller screens (e.g., mobile devices). Such accurate determination can also result in more efficient use of processing resources by reducing consumption of computing resources needed to play a media item portion that the user is not interested in viewing and/or to support navigation of a media item by the user who would continue searching for the time point to which the media item should be skipped. Further, by determining locally (as opposed to doing it at the server) the time point that the user intended to skip to, there can be reduced latency in skipping to the time point during playback of the media item, which thus reduces lagging during media item playback and results in improved performance.

FIG. 1 illustrates an example system architecture 100, in accordance with implementations of the present disclosure. The system architecture 100 (also referred to as "system" herein) includes client devices 102A-N, a data store 110, a platform 120, and/or a platform server 130 each connected to a network 108. In implementations, network 108 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. In some embodiments, a data item can correspond to one or more portions of a document and/or a file displayed via a graphical user interface (GUI) on a client device 102, in accordance with embodiments described herein. Data store 110 can be hosted by one or more storage devices, such as main memory, magnetic or optical storage-based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by platform 120 or one or more different machines coupled to the platform 120 and/or platform server 130 via network 108.

The client devices 102A-N can each include computing devices such as personal computers (PCs), laptops, mobile phones, smart phones, tablet computers, netbook computers, network-connected televisions, etc. In some implementations, client devices 102A-N may also be referred to as "user devices." Client devices 102A-N can include a content viewer. In some implementations, a content viewer can be an application that provides a user interface (UI) for users to view or upload content, such as images, video items, web pages, documents, etc. For example, the content viewer can be a web browser that can access, retrieve, present, and/or navigate content (e.g., web pages such as Hyper Text Markup Language (HTML) pages, digital media items, etc.) served by a web server. The content viewer can render, display, and/or present the content to a user. The content viewer can also include an embedded media player (e.g., a Flash® player or an HTML5 player) that is embedded in a web page (e.g., a web page that may provide information about a product sold by an online merchant). In another example, the content viewer can be a standalone application (e.g., a mobile application or app) that allows users to view digital media items (e.g., digital video items, digital images, electronic books, etc.). According to aspects of the disclosure, the content viewer can be a content platform application for users to record, edit, and/or upload content for sharing on platform 120. As such, the content viewers and/or the UI associated with the content viewer can be provided to client devices 102A-N by platform 120. In one example, the content viewers may be embedded media players that are embedded in web pages provided by the platform 120.

A media item 121 can be consumed via the Internet or via a mobile device application, such as a content viewer of client devices 102A-N. In some embodiments, a media item 121 can correspond to a media file (e.g., a video file, an audio file, a video stream, an audio stream, etc.). In other or similar embodiments, a media item 121 can correspond to a portion of a media file (e.g., a portion or a chunk of a video file, an audio file, etc.). As discussed previously, a media item 121 can be requested for presentation to the user by the user of the platform 120. As used herein, "media," media item," "online media item," "digital media," "digital media item," "content," and "content item" can include an electronic file that can be executed or loaded using software, firmware or hardware configured to present the digital media item to an entity. As indicated above, the platform 120 can store the media items 121, or references to the media items 121, using the data store 110, in at least one implementation. In another implementation, the platform 120 can store media item 121 or fingerprints as electronic files in one or more formats using data store 110. Platform 120 can provide media item 121 to a user associated with a client device 102A-N by allowing access to media item 121 (e.g., via a content platform application), transmitting the media item 121 to the client device 102, and/or presenting or permitting presentation of the media item 121 via client device 102.

In some embodiments, media item 121 can be a video item. A video item refers to a set of sequential video frames (e.g., image frames) representing a scene in motion. For example, a series of sequential video frames can be captured continuously or later reconstructed to produce animation. Video items can be provided in various formats including, but not limited to, analog, digital, two-dimensional and three-dimensional video. Further, video items can include movies, video clips, video streams, or any set of images (e.g., animated images, non-animated images, etc.) to be displayed in sequence. In some embodiments, a video item can be stored (e.g., at data store 110) as a video file that includes a video component and an audio component. The video component can include video data that corresponds to one or more sequential video frames of the video item. The audio component can include audio data that corresponds to the video data.

Platform 120 can include multiple channels (e.g., channels A through Z). A channel can include one or more media items 121 (e.g., media items 121A-121N) available from a common source or media items 121 having a common topic, theme, or substance. Media item 121 can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking," "following," "friending," and so on.

In some embodiments, system 100 can include one or more other platforms (not shown) and can provide other services associated with media items 121. For example, another platform can be a third-party advertisement platform that can provide video and/or audio advertisements. In another example, another platform can be a video streaming service provider that provides a media streaming service via a communication application for users to play videos, TV shows, video clips, audio, audio clips, and movies, on client devices 102.

In some embodiments, a client device 102 hosts client application 103 (e.g., a mobile application, a desktop application, a web browser, etc.) that can transmit a request to platform server 130 for a media item 121. Platform server 130 may be part of platform 120 and may identify the media item 121 of the request (e.g., at data store 110, etc.) and may provide access to the media item 121 via the UI of the content viewer (e.g., media player) of the client application 103. In some embodiments, the requested media item 121 may have been generated by another client device 102 connected to platform 120. For example, client device 102A can generate a video item (e.g., via an audiovisual component, such as a camera, of client device 102A) and provide the generated video item to platform 120 (e.g., via network 108) to be accessible by other users of the platform. In other or similar embodiments, the requested media item 121 may have been generated using another device (e.g., that is separate or distinct from client device 102A) and transmitted to client device 102A (e.g., via a network, via a bus, etc.). Client device 102A can provide the video item to platform 120 (e.g., via network 108) to be accessible by other users of the platform, as described above. Another client device, such as client device 102N, can transmit the request to platform 120 (e.g., via network 108) to access the video item provided by client device 102A, in accordance with the previously provided examples.

In some embodiments, the UI of the content viewer provided by platform 120 (referred to simply as platform UI herein) may include one or more UI elements that enable a user to control a playback of the media item 121 via the content viewer. For example, the platform UI may include one or more UI elements that enable the user to initiate playback of the media item 121 (e.g., a "play" button) and/or pause playback of the media item 121 (e.g., a "pause" button). In another example, the platform UI may include one or more UI elements that enable the user to skip to a next time point of the media item 121, such as a scroll bar (e.g., a time bar), where each portion of the scroll bar represents a different time point within the media item 121.

As illustrated in FIG. 1, the client device 102 can include a time point engine 151 that can be part of client application 103 or another client application (not shown), which can be a mobile application, a desktop application, a web browser, etc. Time point engine 151 can be configured to identify one or more user interaction events that are each associated with the media item 121 at one or more time points of a set of time points within the media item 121. For example, the user interaction events can include one or more interaction events with one or more UI elements of the platform UI that pertain to the presentation of the media item 121 to the user. For example, the user interaction events can include a user click operation or a user scrolling operation in relation to the UI elements. To identify each of the user interaction events, time point engine 151 can identify a change in the position of the cursor relative to the scroll bar from one (e.g., first) position to another (e.g., second) position, such as the user selecting a particular time point within the media item 121 to skip to during current playback of the media item 121. Time point engine 151 can compute a trajectory value based on the change in the position of the cursor from the first position to the second position. Time point engine 151 can further determine a next time point that the user intended to skip to during the current playback of the media item 121. For example, time point engine 151 can determine a set of viewing data for the media item 121 based on the user interaction events identified during the current playback of the media item 121 (e.g., the change in the position of the cursor relative to the scroll bar from one position to another position) and one or more user interaction events during prior playbacks of the media item 121 (e.g., previous views of the media item 121 by a set of users, previous views of the media item 121 by the user currently consuming the media item 121, previous views of the media item 121 by one or more users connected to the user, such as social connections of the user and/or contacts of the user, etc.). In some embodiments, the user interaction events during prior playbacks of the media item 121 can be stored (e.g., by the platform server 130) in data store 110 in association with the media item 121. In some embodiments, time point engine 151 can provide graphical representations (e.g., histograms) of the set of viewing data as input to a machine learning model, as described in more details herein. Time point engine 151 can obtain an output of the machine learning model, where the obtained output indicates the next time point to skip to during the current playback of the media item 121 (e.g., a prediction of the next time point intended by the user).

Time point engine 151 can store the next time point in association with an identifier of the media item 121 locally on the client device 102. Subsequently, in response to the user of client device 102 requesting to skip to a particular time point during current playback of the media item 121, the playback of the media item can be skipped to the next time associated with the identifier of the media item 121. In some embodiments, time point engine 151 can also provide the next time point to platform server 130, which can store it in data store 110 in association with the media item 121 and the user account of the user of client device 102.

It should be noted that although FIG. 1 illustrates time point engine 151 as part of client device 102, in additional or alternative embodiments, time point engine 151 can reside on one or more server machines such as platform server 130 or server(s) of a platform other than platform 120.

It should be noted that in some other implementations, the functions of platform server 130 and/or platform 120 can be provided by a fewer number of machines. For example, in some implementations, components and/or modules of any of platform server 130 and/or platform 120 may be integrated into a single machine, while in other implementations components and/or modules of any of platform server 130 and/or platform 120 may be integrated into multiple machines.

In general, functions described in implementations as being performed by platform 120 and/or platform server 130 can also be performed on the client devices 102A-N in other implementations. In addition, the functionality attributed to a particular component can be performed by different or multiple components operating together. Platform 120 can also be accessed as a service provided to other systems or devices through appropriate application programming interfaces, and thus is not limited to use in websites.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline of platform 120.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2:
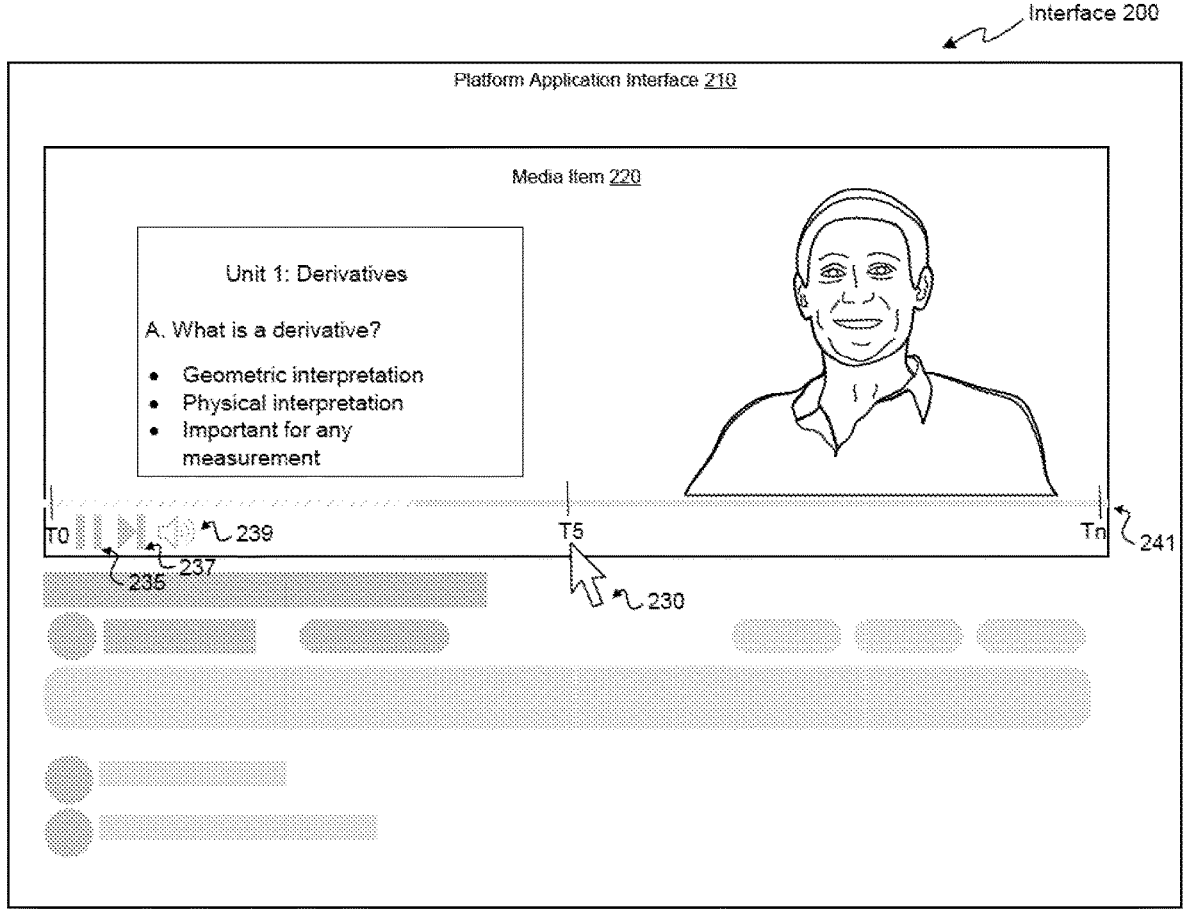
FIG. 2 illustrates an example interface for determining a time point to skip to within a media item using user interaction events, in accordance with implementations of the present disclosure.

FIG. 2 illustrates an example user interface (UI) 200 of a content viewer provided by platform 120 of FIG. 1 for determining a time point to skip to within a media item (e.g., the media item 121) using user interaction events, in accordance with implementations of the present disclosure. The UI 200 may be provided by an application (e.g., client application 103 of FIG. 1) of a client device. The application may be a web browser or another application associated with/provided by a content platform (e.g., platform 120 of FIG. 1), including a mobile application, a desktop application, or the like. User interaction with various elements of the UI 200 of FIG. 2 may cause changes to the interface elements presented. Various interactions between the UI and interface elements presented in FIG. 2 are possible (e.g., scrolling through a scroll bar, clicking on a portion of a scroll bar, etc.), and any interactions between sample interfaces, similar interfaces, inclusion of similar interface elements, etc., are within the scope of this disclosure. FIG. 2 is described in connection with video content items, but other types of content items (e.g., image content, text content, audio content, etc.) may be presented in similar interfaces.

In some embodiments, UI 200 can include a media item 220. Media item 220 may be a video item. In some embodiments, UI 200 can include one or more UI elements that enable the user to initiate playback of the media item 220 (e.g., a "play" button), pause playback of the media item 220 (e.g., a "pause" button 235), and/or rewind or fast-forward playback of the media item 220 (e.g., a "fast-forward" button 237), etc. In another example, the UI 200 can include one or more UI elements that enable the user to skip to a next time point of the media item 220, such as a scroll bar 241 (e.g., a time bar), where each portion of the scroll bar represents a different time point (e.g., T0-Tn) within the media item 220. In some embodiments, the UI 200 can include one or more UI elements to enable the user to control an audio of the media item 220 (e.g., a "volume" button 239). In some embodiments, the UI 200 can present a representation of a cursor 230. Cursor 230 may be controlled by an input device (e.g., mouse, trackpad, trackball, joystick, etc.) of a client device of a user of platform 120 of FIG. 1. Client device 102 may include a cursor tracker that may periodically store a position of cursor 230 in a local memory of the client device at intervals of time t (e.g., $P_{t-3}$, $P_{t-2}$, $P_{t-1}$, $P_t$). As illustrated in FIG. 2, the cursor 230 can be proximate to a portion of the scroll bar 241 representing time point T5 within the media item 220. In some embodiments, the change in the position of the cursor 230 and/or a trajectory value of the change in the position of the cursor 230 can correspond to a user interaction event, as described herein.

Figure 3A:
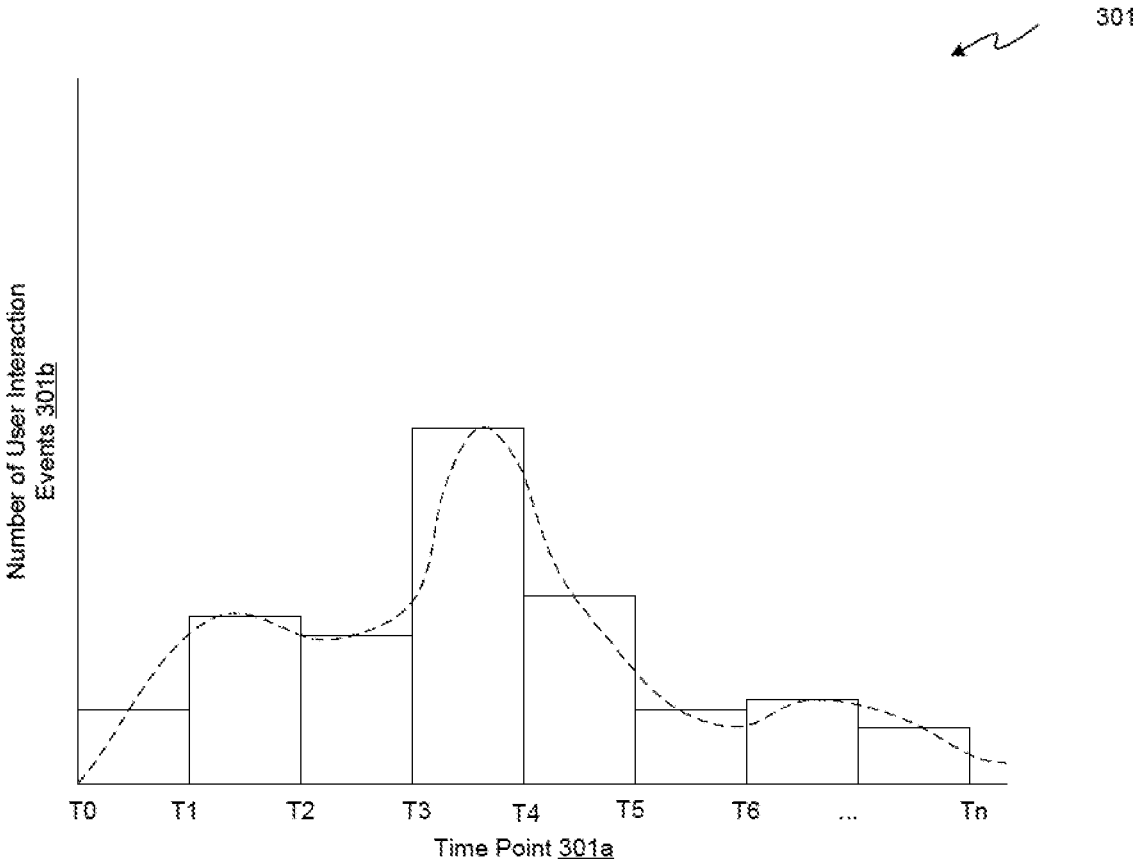
FIGS. 3A-3C illustrate example representations of viewing data for a media item, in accordance with implementations of the present disclosure.
Figure 3B:
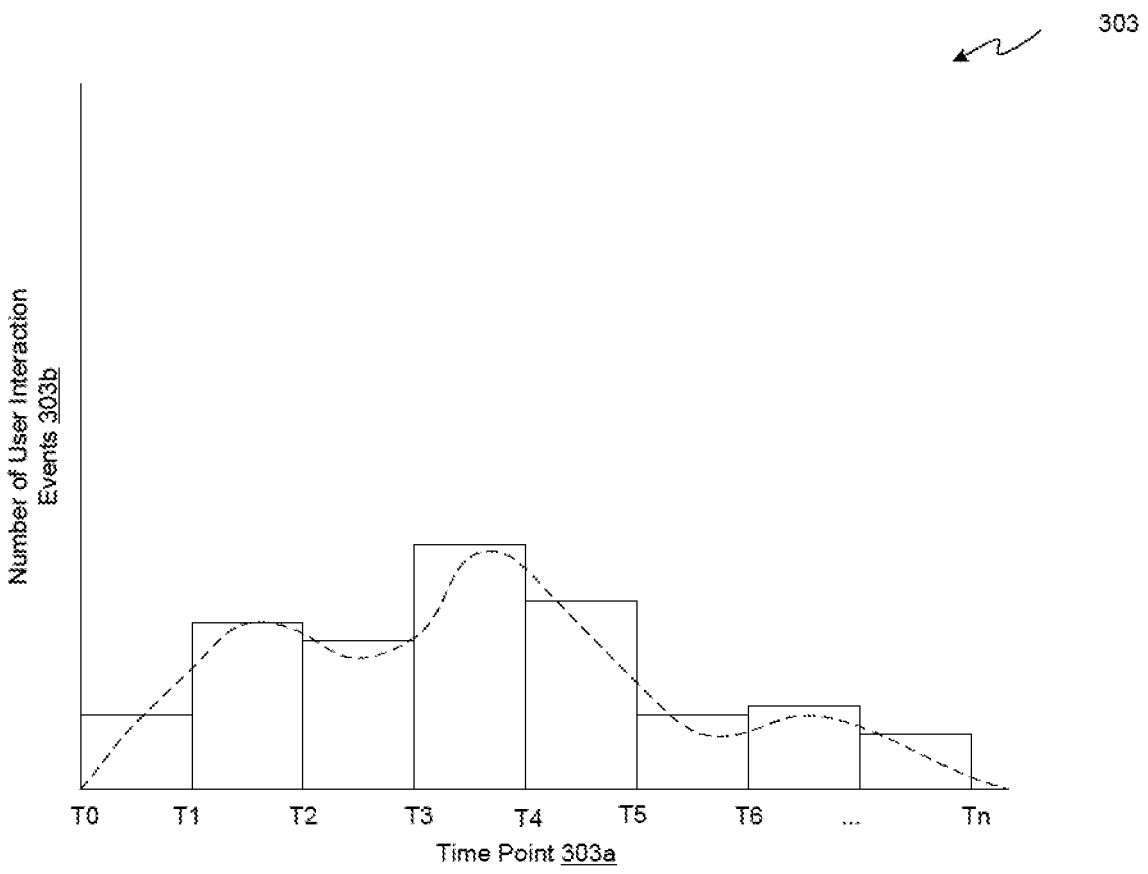
Figure 3C:
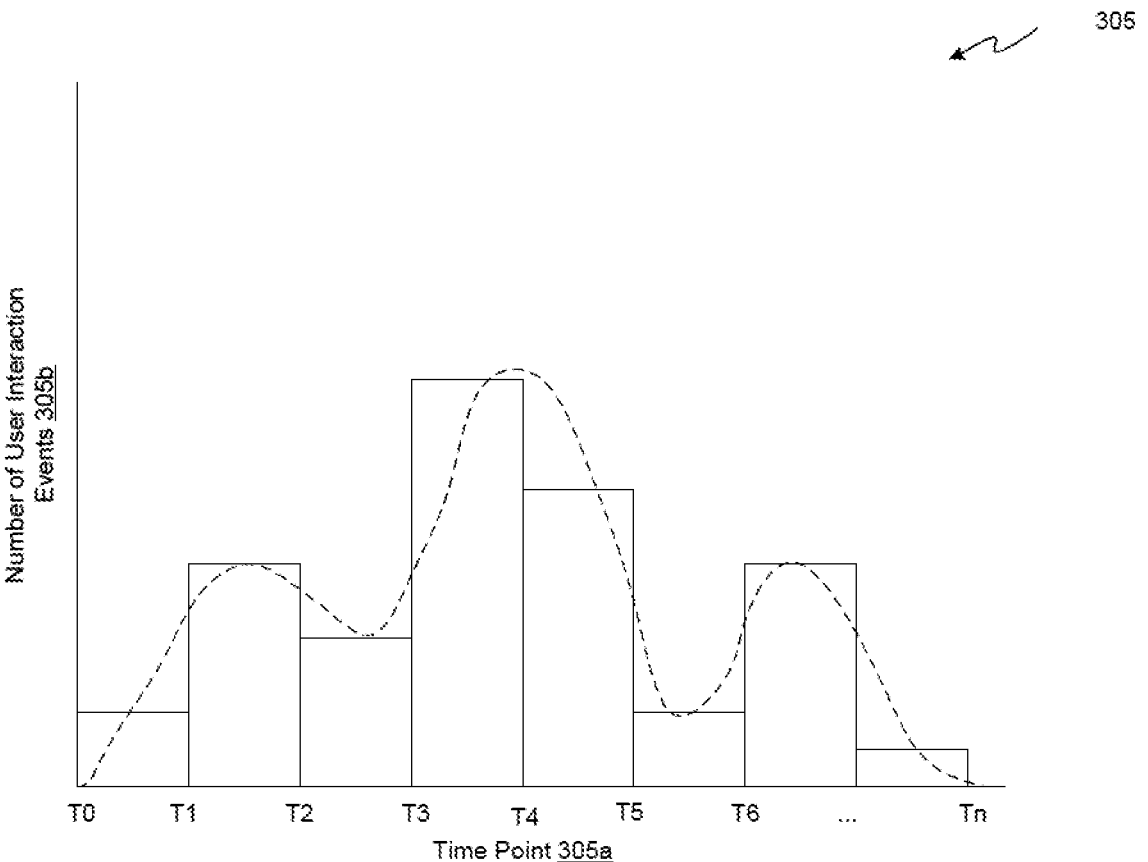

FIGS. 3A-3C illustrate example representations of subsets of viewing data for a media item, in accordance with implementations of the present disclosure. In some embodiments, each representation can be a histogram. For example, as illustrated in FIG. 3A, a first subset of viewing data for the media item can be represented as a histogram 301. The histogram 301 is shown using a first axis (e.g., an x-axis) corresponding to a set of time points 301a of a media item (e.g., the media item 121 of FIG. 1) and a second axis (e.g., a y-axis) corresponding to one or more user interaction events 301b at each respective time point 301a (e.g., T0-Tn), which can be aggregated and normalized in a vector format. In some embodiments, the user interaction events 301b can be previous views of the media item by one or more users. The previous views of the media item by one or more users at each respective time point can be aggregated (e.g., by the platform server 130 of FIG. 1) and normalized (e.g., scaled to a range of 0 to 1). In some embodiments, the previous views of the media item by one or more users can be stored (e.g., by the platform server 130 of FIG. 1) in data store 110 in association with the media item and then used to better understand the prior distribution of whether the user attention is likely to be and to predict an intent-driven time point to skip to during playback of the media item. In some embodiments, as illustrated in FIG. 3B, another (e.g., a second) subset of the viewing data for the media item can be represented as a histogram 303. The histogram 303 using a first axis (e.g., an x-axis) corresponding to a set of time points 303a of the media item (e.g., the media item 121 of FIG. 1) and a second axis (e.g., a y-axis) corresponding to one or more user interaction events 303b at each respective time point 303a (e.g., T0-Tn), which can be aggregated and normalized in a vector format. In some embodiments, the user interaction events 303b can be previous views of the media item by the user currently consuming the media item. The previous views of the media item by the user at each respective time point can be aggregated (e.g., by the platform server 130 of FIG. 1) and normalized (e.g., scaled to a range of 0 to 1). In some embodiments, the previous views of the media item by the user can be stored (e.g., by the platform server 130 of FIG. 1) in data store 110 in association with the media item and then used to personalize the intent-driven time point result. In some embodiments, as illustrated in FIG. 3C, another (e.g., a third) subset of the viewing data for the media item can be represented as a histogram 305. The histogram 305 is shown using a first axis (e.g., an x-axis) corresponding to a set of time points 305a of the media item (e.g., the media item 121 of FIG. 1) and a second axis (e.g., a y-axis) corresponding to one or more user interaction events 305b at each respective time point 305a (e.g., T0-Tn), which can be aggregated and normalized in a vector format. In some embodiments, the user interaction events 305b can be one or more user interaction events each associated with the user skipping to a particular time point during current playback of the media item. Each of the user interaction events can include a trajectory value of a cursor at one or more time points during the current playback of the media item. The trajectory value can be based on the change in the position of the cursor from a first position to a second position, such as when the user is selecting a portion of the scroll bar to skip to a particular time point during the current playback of the media item. In some embodiments, the trajectory value is repeatedly updated at a predefined frequency (e.g., at 10 Hz). The trajectory value of the cursor at each respective time point can be aggregated (e.g., by the time engine 151 of the client device 102 or the platform server 130 of FIG. 1) and normalized (e.g., scaled to a range of 0 to 1) to reflect the baseline time point estimate, which when used together with the other two histograms can result in a more intent-aware, clean time point estimate. As discussed above, the third histogram can be updated dynamically while the first and second histograms can be more static (e.g., with much slower update rate such as every few days).

FIG. 4 depicts a flow diagram of an example method for determining a time point to skip to within a media item using user interaction events, in accordance with implementations of the present disclosure. Method 400 can be performed by processing logic that can include hardware (circuitry, dedicated logic, etc.), software (e.g., instructions run on a processing device), or a combination thereof. In one implementation, some or all of the operations of method 400 can be performed by one or more components of system 100 of FIG. 1. In some embodiments, some or all of the operations of method 400 can be performed by client device 102 (e.g., time point engine 151), as described above.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

In some embodiments, at block 410, the processing logic implementing method 400 provides a media item (e.g., the media item 121 of FIG. 1) to a user of a platform (e.g., the platform 120 of FIG. 1). In some embodiments, the media item can be a video item and/or an audio item.

At block 420, the processing logic identifies one or more user interaction events. In some embodiments, each of the user interaction events is associated with the user request to skip to a particular time point during current playback of the media item. In some embodiments, the user interaction events can include one or more interaction events with one or more user interface (UI) elements that pertain to the presentation of the media item to the user. For example, the one or more user interaction events can include a user click operation or a user scrolling operation in relation to the one or more UI elements. Such UI elements can include, for example, a scroll bar (e.g., a time bar), a representation of a cursor, etc. In some embodiments, to identify one or more user interaction events, the processing logic can identify, using a client component (e.g., the client application 103 of FIG. 1), a change in the position of the cursor relative to the scroll bar from one (e.g., first) position to another (e.g., second) position presented on a client device associated with the user of the platform (e.g., the client device 102 of FIG. 1), where the media item is being presented on the UI. In some embodiments, the processing logic can compute, based on the change in the position of the cursor, a trajectory value of the change in the position of the cursor from the first position to the second position. For example, the trajectory value can be a difference (e.g., in seconds) between the video's first time point that corresponds to the first position on the scroll bar and the video's second time point that corresponds to the second position on the scroll bar. In some embodiments, the trajectory value can be repeatedly updated (e.g., computed) at a predefined frequency. For example, the predefined frequency can be 10 Hz. In some embodiments, the trajectory value can be calculated on the client device (e.g., by the time engine 151 of client device 102 of FIG. 1). In some embodiments, the trajectory value can be calculated at the server (e.g., by the platform server 130 and/or the time engine 151 of the platform server 130 of FIG. 1). The trajectory value can be stored in local memory of the client device and/or at a data store accessible to the client device and the server (e.g., the data store 110 of FIG. 1).

At block 430, the processing logic determines a next time point intended by the user to skip to during current playback of the media item. At block 440, to determine the next time point, the processing logic determines a set of viewing data for the media item based on the one or more user interaction events during the current playback of the media item identified at block 420 and one or more user interaction events during one or more prior playbacks of the media item. In some embodiments, the user interaction events during prior playbacks of the media item can include previous views of the media item by a set of users, previous views of the media item by the user (e.g., the user currently consuming the media item), previous views of the media item by one or more users connected to the user, such as social connections of the user and/or contacts of the user, etc. A subset of a set of viewing data can be transformed into a particular type of graphical representation (e.g., a histogram). For example, the user interaction events during the current playback of the media item can be represented in vector format in a first histogram (e.g., the histogram 301 of FIG. 3A), as described with respect to FIG. 3A. The previous views of the media item by the set of users can be represented in vector format in a second histogram (e.g., the histogram 303 of FIG. 3B), as described with respect to FIG. 3B. The previous views of the media item by the user can be represented in vector format in a third histogram (e.g., the histogram 305 of FIG. 3C), as described with respect to FIG. 3C. In some embodiments, the previous views of the media item by one or more users connected to the user can be represented in vector format in a fourth histogram similar to each of the histograms of FIGS. 3A-3C. In some embodiments, the second and third histograms At block 450, the processing logic identifies, based on the determined set of viewing data at block 440, the next time point intended by the user to skip to during the current playback of the media item. In some embodiments, identifying the next time point can include providing the set of viewing data for the media item as input to a machine learning model. In some embodiments, the machine learning model can be stored in local memory on the client device. In some embodiments, the machine learning model can be stored at a server (e.g., the platform server 130 of FIG. 1). The machine learning model can be a deep network. An example of a deep network is a neural network with one or more hidden layers, such as a convolutional neural network (CNN). In some embodiments, the machine learning model can be a one-dimensional (1D) multi-headed CNN. In some embodiments, the machine learning model has one or more fully connected layers as the final layer(s). The machine learning model can be trained by, for example, adjusting weights of a neural network in accordance with a back-propagation learning algorithm or the like. In some embodiments, the machine learning model can be trained on training data to predict the next time point intended by the user to skip to during current playback of the media item. In some embodiments, the training data contains training inputs including historical viewing data of media items (e.g., historical viewing data represented as one or more histograms), and corresponding target outputs (e.g., floating point numbers such as numbers between 0 to 1) specifying respective time points that users skipped to during playback of associated media items. In some embodiments, the machine learning model is trained by a platform server (e.g., platform server 130) which can generate the above training inputs and target outputs using data stored in the platform's data store (e.g., data store 110), initiate and/or perform the training of the machine learning model, facilitate the use of the trained machine learning model to provide predicted time points to which to skip during playback of media items (e.g., by including the trained machine learning model into a client application distributed to client devices or by using the trained machine learning model at the server), and then periodically update the machine learning model based on newly collected data.

In some embodiments, the processing logic can obtain an output of the trained machine learning model. For example, the above three histograms can be provided as input to the trained machine learning model in a multi-headed fashion to output a refined time scroll location. The output of the trained machine learning model can be a floating point number indicating the next time point to skip to during the current playback of the media item. In some embodiments, the processing logic can determine (e.g., compute) the next time point using the floating point number by multiplying the floating point number by the total length of the media item. For example, the output of the machine learning model can be 0.4. The total length of the media item can be 5 minutes (e.g., 300 seconds). Accordingly, the processing logic can multiply 0.4 by 300 seconds to compute 120 seconds. Thus, the processing logic can determine that the next time point to skip to during the current playback of the media item is 120 seconds (e.g., at 120 seconds within the media item). In some embodiments, the processing logic can retrieve the total length of the media item from a data store, such as the data store 110 of FIG. 1.

At block 460, the processing logic causes playback of the media item to skip to the determined next time point which can represent, for example, a correction from an inaccurate touch-and-scroll event to a more refined intent-driven time point. Thus, in some embodiments, when the user requests to skip to a particular time point during current playback of the media item, playback of the media item can be skipped to the determined next time point (e.g., the time point that the user intended to skip to during current playback of the media item) rather than the particular time point that corresponds to the user interaction event with respect to, for example, the scroll bar (e.g., an inaccurate time point and/or the time point that is not what the user intended to skip to).

Figure 5:
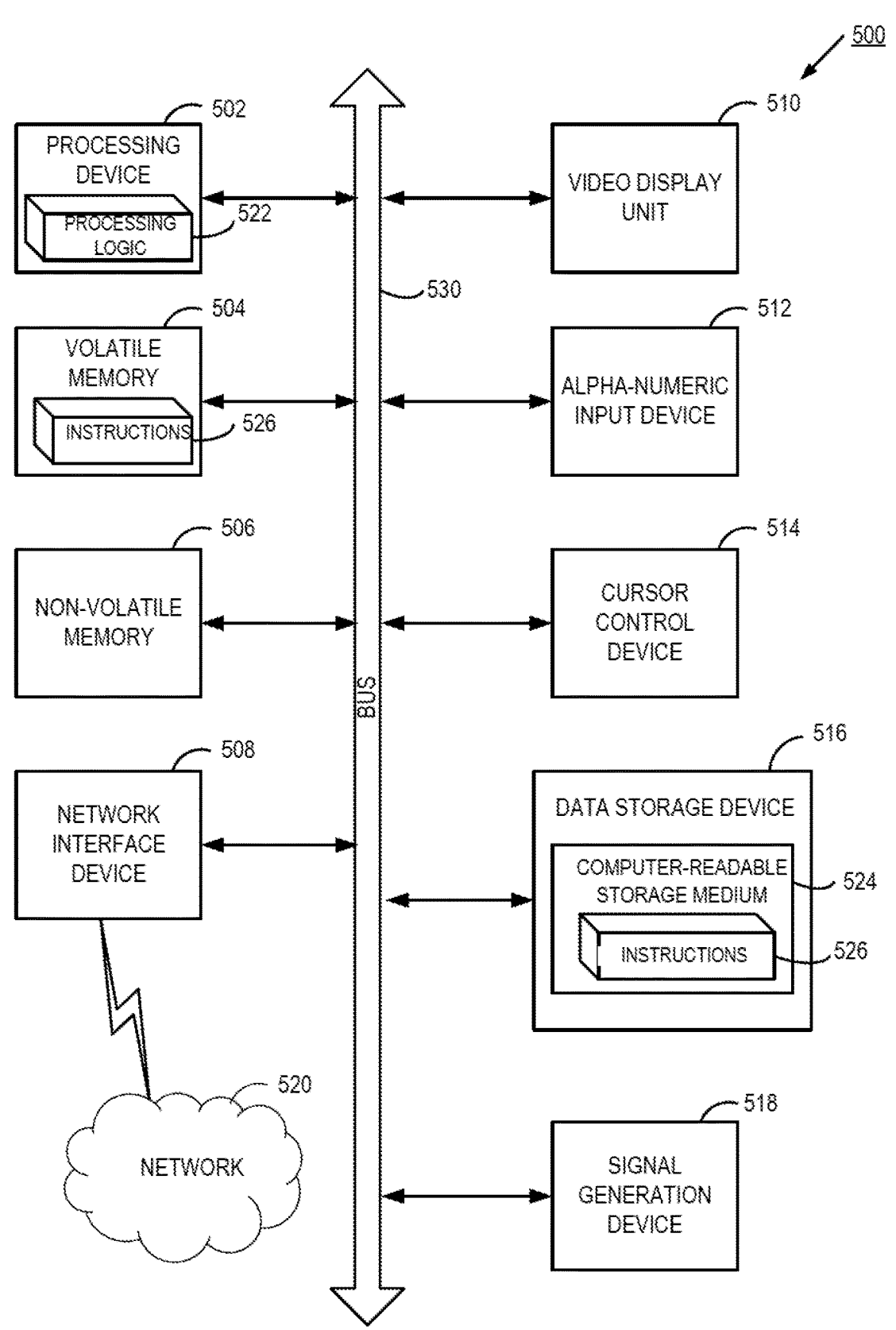
FIG. 5 is a block diagram illustrating an exemplary computer system, in accordance with implementations of the present disclosure.

FIG. 5 is a block diagram illustrating an exemplary computer system 500, in accordance with implementations of the present disclosure. The computer system 500 can correspond to platform 120 and/or client devices 102A-N, described with respect to FIG. 1. Computer system 500 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 540.

Processor (processing device) 502 represents one or more general-purpose processing devices such as a microprocessor, central processing unit, or the like. More particularly, the processor 502 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 can also be one or more special-purpose processing devices such as an application specific integrated circuit (ASIC), a field programmable gate array (FPGA), a digital signal processor (DSP), network processor, or the like. The processor 502 is configured to execute instructions 505 (e.g., for determining a time point to skip to within a media item using user interaction events) for performing the operations discussed herein.

The computer system 500 can further include a network interface device 508. The computer system 500 also can include a video display unit 510 (e.g., a liquid crystal display (LCD) or a cathode ray tube (CRT)), an input device 512 (e.g., a keyboard, and alphanumeric keyboard, a motion sensing input device, touch screen), a cursor control device 514 (e.g., a mouse), and a signal generation device 520 (e.g., a speaker).

The data storage device 518 can include a non-transitory machine-readable storage medium 524 (also computer-readable storage medium) on which is stored one or more sets of instructions 505 (e.g., for determining a time point to skip to within a media item using user interaction events) embodying any one or more of the methodologies or functions described herein. The instructions can also reside, completely or at least partially, within the main memory 504 and/or within the processor 502 during execution thereof by the computer system 500, the main memory 504 and the processor 502 also constituting machine-readable storage media. The instructions can further be transmitted or received over a network 530 via the network interface device 508.

In one implementation, the instructions 505 include instructions for determining a time point to skip to within a media item using user interaction events. While the computer-readable storage medium 524 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:

providing, by a processing device, a media item to a user of a platform;

receiving, via a user interface presented on a user device of the user, a skip request of the user during current playback of the media item, wherein the skip request is provided via a user gesture on the user interface, and wherein the user gesture indicates a first time point in the media item;

determining, by the processing device, whether the first time point indicated by the user gesture represents a time point intended by the user to skip to during the current playback of the media item, wherein determining whether the first time point indicated by the user gesture represents the time-point intended by the user comprises:

identifying, by the processing device, one or more user interaction events each associated with the user skipping to a particular time point during current playback of the media item;

determining, by the processing device, a plurality of viewing data for the media item based on the one or more user interaction events during the current playback of the media item and user interaction events during prior playbacks of the media item;

providing, by the processing device, the plurality of viewing data for the media item as input to a trained machine learning model trained to predict the time point intended by the user to skip to during the current playback of the media item; and obtaining, by the processing device, an output of the trained machine learning model, wherein the output of the trained machine learning model indicates a second time point within the media item; and responsive to determining that the first time point indicated by the user gesture does not represent the time point intended by the user to skip to during the current playback of the media item, causing, by the processing device, the first time point indicated by the user gesture to be corrected based on the second time point indicated by the output of the trained machine learning model when responding to the skip request of the user.

2. The method of claim 1, wherein the one or more user interaction events comprise one or more interaction events with one or more user interface (UI) elements pertaining to presentation of the media item, wherein the media item is being presented on a UI of a client device associated with the user, wherein the one or more UI elements comprise a scroll bar and a representation of a cursor, and wherein identifying the one or more user interaction events comprises:

identifying a change in a position of the cursor relative to the scroll bar from a first position to a second position, wherein the second position corresponds to the particular time point within the media item.

3. The method of claim 2, wherein determining the plurality of viewing data for the media item comprises:

identifying a first representation of a first subset of the plurality of viewing data for the media item, the first subset comprising previous views of a plurality of users associated with the media item;

identifying a second representation of a second subset of the plurality of viewing data for the media item, the second subset comprising previous views of the media item by the user; and identifying a third representation of a third subset of the plurality of viewing data for the media item, the third subset being based on the one or more user interaction events and comprising one or more trajectory values of the cursor at one or more time points during current playback of the media item, wherein the one or more trajectory values of the cursor comprises a trajectory value that is based on the change in the position of the cursor from the first position to the second position.

4. The method of claim 3, wherein each representation of the first representation, second representation, and third representation comprises a histogram, and wherein each subset of the plurality of viewing data is aggregated and normalized in a vector format.

5. The method of claim 3, wherein determining the plurality of viewing data for the media item further comprises:

identifying a fourth representation of a fourth subset of the plurality of viewing data for the media item, the fourth subset comprising previous views of the media item by users connected to the user, the users connected to the user comprising social connections of the user and/or contacts of the user.

6. The method of claim 1, wherein the machine learning model is a one-dimensional (ID) multi-headed convolutional neural network with one or more fully connected layers.

7. The method of claim 1, wherein determining whether the first time point represents a time-point intended by the user to skip to is performed at a client device of the user.

8. A system comprising:

a memory device; and a processing device coupled to the memory device, the processing device to perform operations comprising:

providing a media item to a user of a platform;

receiving, via a user interface presented on a user device of the user, a skip request of the user during current playback of the media item, wherein the skip request is provided via a user gesture on the user interface, and wherein the user gesture indicates a first time point in the media item;

determining whether the first time point indicated by the user gesture represents a time point intended by the user to skip to during the current playback of the media item, wherein determining whether the first time point indicated by the user gesture represents the time-point intended by the user comprises:

identifying one or more user interaction events each associated with the user skipping to a particular time point during current playback of the media item;

determining a plurality of viewing data for the media item based on the one or more user interaction events during the current playback of the media item and user interaction events during prior playbacks of the media item;

providing the plurality of viewing data for the media item as input to a trained machine learning model trained to predict the time point intended by the user to skip to during the current playback of the media item; and obtaining an output of the trained machine learning model, wherein the output of the trained machine learning model indicates a second time point within the media item; and responsive to determining that the first time point indicated by the user gesture does not represent the time point intended by the user to skip to during the current playback of the media item, causing device the first time point indicated by the user gesture to be corrected based on the second time point indicated by the output of the trained machine learning model when responding to the skip request of the user.

9. The system of claim 8, wherein the one or more user interaction events comprise one or more interaction events with one or more user interface (UI) elements pertaining to presentation of the media item, wherein the media item is being presented on a UI of a client device associated with the user, wherein the one or more UI elements comprise a scroll bar and a cursor, and wherein to identify the one or more user interaction events, the processing device is to perform operations further comprising:

identifying a change in a position of the cursor relative to the scroll bar from a first position to a second position, wherein the second position corresponds to the particular time point within the media item.

10. The system of claim 9, wherein to determine the plurality of viewing data for the media item, the processing device is to perform operations further comprising:

identifying a first representation of a first subset of the plurality of viewing data for the media item, the first subset comprising previous views of a plurality of users associated with the media item;

identifying a second representation of a second subset of the plurality of viewing data for the media item, the second subset comprising previous views of the media item by the user; and identifying a third representation of a third subset of the plurality of viewing data for the media item, the third subset being based on the one or more user interaction events and comprising one or more trajectory values of the cursor at one or more time points during current playback of the media item, wherein the one or more trajectory values of the cursor comprises a trajectory value that is based on the change in the position of the cursor from the first position to the second position.

11. The system of claim 10, wherein each representation of the first representation, second representation, and third representation comprises a histogram, and wherein each subset of the plurality of viewing data is aggregated and normalized in a vector format.

12. The system of claim 10, wherein to determine the plurality of viewing data for the media item, the processing device is to perform operations further comprising:

identifying a fourth representation of a fourth subset of the plurality of viewing data for the media item, the fourth subset comprising previous views of the media item by users connected to the user, the users connected to the user comprising social connections of the user and/or contacts of the user.

13. The system of claim 8, wherein the machine learning model is a one-dimensional (ID) multi-headed convolutional neural network with one or more fully connected layers.

14. A non-transitory computer readable storage medium comprising instructions for a server that, when executed by a processing device, cause the processing device to perform operations comprising:

providing a media item to a user of a platform;

receiving, via a user interface presented on a user device of the user, a skip request of the user during current playback of the media item, wherein the skip request is provided via a user gesture on the user interface, and wherein the user gesture indicates a first time point in the media item;

determining whether the first time point indicated by the user gesture represents a time point intended by the user to skip to during the current playback of the media item, wherein determining whether the first time point indicated by the user gesture represents the time-point intended by the user comprises:

identifying one or more user interaction events each associated with the user skipping to a particular time point during current playback of the media item;

determining a plurality of viewing data for the media item based on the one or more user interaction events during the current playback of the media item and user interaction events during prior playbacks of the media item;

providing the plurality of viewing data for the media item as input to a trained machine learning model trained to predict the time point intended by the user to skip to during the current playback of the media item; and obtaining an output of the trained machine learning model, wherein the output of the trained machine learning model indicates a second time point within the media item; and responsive to determining that the first time point indicated by the user gesture does not represent the time point intended by the user to skip to during the current playback of the media item, causing device the first time point indicated by the user gesture to be corrected based on the second time point indicated by the output of the trained machine learning model when responding to the skip request of the user.

15. The non-transitory computer readable storage medium of claim 14, wherein the one or more user interaction events comprise one or more interaction events with one or more user interface (UI) elements pertaining to presentation of the media item, wherein the media item is being presented on a UI of a client device associated with the user, wherein the one or more UI elements comprise a scroll bar and a cursor, and wherein to identify the one or more user interaction events, the processing device is to perform operations further comprising:

identifying a change in a position of the cursor relative to the scroll bar from a first position to a second position, wherein the second position corresponds to the particular time point within the media item.

16. The non-transitory computer readable storage medium of claim 15, wherein to determine the plurality of viewing data for the media item, the processing device is to perform operations further comprising:

identifying a first representation of a first subset of the plurality of viewing data for the media item, the first subset comprising previous views of a plurality of users associated with the media item;

identifying a second representation of a second subset of the plurality of viewing data for the media item, the second subset comprising previous views of the media item by the user; and identifying a third representation of a third subset of the plurality of viewing data for the media item, the third subset being based on the one or more user interaction events and comprising one or more trajectory values of the cursor at one or more time points during current playback of the media item, wherein the one or more trajectory values of the cursor comprises a trajectory value that is based on the change in the position of the cursor from the first position to the second position.

17. The non-transitory computer readable storage medium of claim 16, wherein each representation of the first representation, second representation, and third representation comprises a histogram, and wherein each subset of the plurality of viewing data is aggregated and normalized in a vector format.

* * * * *